(12) United States Patent
Coenen et al.

(10) Patent No.: US 9,768,978 B2
(45) Date of Patent: Sep. 19, 2017

(54) METHOD AND SYSTEM FOR PROVIDING PULSED POWER AND DATA ON A BUS

(71) Applicant: VLAAMSE INSTELLING VOOR TECHNOLOGISCH ONDERZOEK (VITO) NV, Mol (BE)

(72) Inventors: Peter Coenen, Glabbeek (BE); Dominique Weyen, Lommel (BE)

(73) Assignee: VLAAMSE INSTELLING VOOR TECHNOLOGISCH ONDERZOEK (VITO) NV, Mol (BE)

( * ) Notice: Subject to any disclaimer, the term of this patent is extended or adjusted under 35 U.S.C. 154(b) by 0 days.

(21) Appl. No.: 15/031,152

(22) PCT Filed: Oct. 27, 2014

(86) PCT No.: PCT/EP2014/073033
§ 371 (c)(1),
(2) Date: Apr. 21, 2016

(87) PCT Pub. No.: WO2015/059314
PCT Pub. Date: Apr. 30, 2015

(65) Prior Publication Data
US 2016/0269195 A1  Sep. 15, 2016

(30) Foreign Application Priority Data

Oct. 25, 2013 (EP) .................................... 13190394

(51) Int. Cl.
*H04L 25/34* (2006.01)
*H04L 25/49* (2006.01)
(Continued)

(52) U.S. Cl.
CPC ...... *H04L 12/40045* (2013.01); *H02J 7/0004* (2013.01); *H02J 7/0014* (2013.01);
(Continued)

(58) Field of Classification Search
CPC ............. H04L 25/0272; H04L 25/0292; H04L 25/028; H04L 25/08; H04L 7/0008;
(Continued)

(56) References Cited

U.S. PATENT DOCUMENTS 3,671,671 A * 6/1972 Watanabe ........... H04L 25/0272
 178/63 R
3,755,628 A * 8/1973 Games ..................... H04L 1/02
 370/445

(Continued)

FOREIGN PATENT DOCUMENTS

| EP | 2302757 A1 | 3/2011 |
|----|------------|--------|
| FR | 2612019 A1 | 9/1988 |
| WO | 2011/036147 A2 | 3/2011 |
| WO | 2011/158051 A1 | 12/2011 |

OTHER PUBLICATIONS

International Search Report (ISR) dated Jan. 30, 2015, for PCT/EP2014/073033.

(Continued)

*Primary Examiner* — James M Perez
(74) *Attorney, Agent, or Firm* — Bacon & Thomas, PLLC

(57) ABSTRACT

A method and system for providing pulsed power and data from a main control unit to slave units via a first bus. The main control unit has an AC signal generator for providing a plurality of first pulses (P1) on the bus for providing the power to the slave units. Each slave unit is AC-coupled to the bus via a first series capacitor arranged for converting the first pulses (P1) into second pulses (P2). Data communication from the main control unit to the slave units is established by modulating the first pulses (P1), and by demodulating the second pulses (P2). The modulation may be based on Pulse Position Modulation, Pulse Width Modulation, Pulse Count Modulation, Pulse Amplitude modulation. Zero, one or more bits may be communicated per first pulse. Optionally the slave units may communicate to the main control unit via a second bus.

19 Claims, 8 Drawing Sheets

(51) Int. Cl.
*H04L 12/40* (2006.01)
*H02J 7/00* (2006.01)
*H04B 3/54* (2006.01)
*H04L 12/403* (2006.01)

(52) U.S. Cl.
CPC ............. *H04B 3/54* (2013.01); *H04L 12/403* (2013.01); *H04L 25/4902* (2013.01)

(58) Field of Classification Search
CPC ....... H04L 25/14; H04L 25/4925; H04L 5/20; H04L 25/49
USPC ................. 375/211–215, 237–238, 242–258, 375/286–294, 353
See application file for complete search history.

(56) References Cited

U.S. PATENT DOCUMENTS

| | | | | |
|---|---|---|---|---|
| 3,868,519 A * | 2/1975 | Green | ...................... | H03K 4/94 327/108 |
| 4,166,196 A * | 8/1979 | Rademaker | ............. | H04L 25/08 178/3 |
| 4,429,384 A * | 1/1984 | Kaplinsky | ............. | G06F 13/374 340/12.16 |
| 4,486,852 A * | 12/1984 | Champlin | ................ | H04B 1/74 713/400 |
| 4,622,551 A * | 11/1986 | Kupersmith | .......... | H04L 12/403 340/3.21 |
| 4,627,076 A * | 12/1986 | Staal | ...................... | H01B 11/00 375/257 |
| 4,719,458 A * | 1/1988 | Miesterfeld | ........... | F02D 41/266 370/447 |
| 4,808,855 A * | 2/1989 | Lloyd | ............. | H03K 17/04126 326/114 |
| 4,888,764 A * | 12/1989 | Haug | ...................... | H04L 12/40 375/219 |
| 5,305,325 A * | 4/1994 | Roos | ...................... | H04Q 11/04 714/703 |
| 5,317,597 A * | 5/1994 | Eisele | ................. | H04L 25/0272 375/257 |
| 5,399,965 A * | 3/1995 | Heberle | ........... | H03K 19/01754 324/117 H |
| 5,589,813 A * | 12/1996 | Nielsen | .................. | H04B 3/548 326/30 |
| 5,729,547 A * | 3/1998 | Dute | ......................... | H04L 5/16 370/447 |
| 6,213,567 B1 * | 4/2001 | Zittlau | .................... | B60T 7/042 188/158 |
| 6,373,376 B1 * | 4/2002 | Adams | ................. | G05B 19/042 340/538.13 |
| 6,425,030 B1 * | 7/2002 | Melcher | .............. | G06F 13/4291 710/106 |
| 6,563,419 B1 * | 5/2003 | Herz | ...................... | H04B 3/50 340/12.15 |
| 6,694,439 B2 * | 2/2004 | Cho | .................. | H04L 12/40032 340/12.37 |
| 6,839,210 B2 * | 1/2005 | Roberts | .................... | H02H 7/22 361/64 |
| 7,015,798 B2 * | 3/2006 | Hair, III | ................... | H04B 3/54 340/12.37 |
| 7,167,536 B2 * | 1/2007 | Muranaka | ............. | H04L 25/028 375/354 |
| 7,355,438 B2 * | 4/2008 | El Sayed | ................ | H04L 12/40 326/30 |
| 7,366,115 B2 * | 4/2008 | Vandensande | ..... | G05B 19/0423 370/257 |
| 7,826,551 B2 * | 11/2010 | Lee | ..................... | H04L 25/0272 327/64 |
| 8,030,941 B2 * | 10/2011 | Coenen | ............. | G01R 31/3662 320/116 |
| 8,063,694 B2 * | 11/2011 | Lindemann | ............. | H04L 25/02 327/541 |
| 8,122,159 B2 * | 2/2012 | Monreal | ............. | G06F 13/4068 710/9 |
| 8,446,977 B2 * | 5/2013 | Ovchinnikov | ........... | H04B 3/50 375/257 |
| 8,897,342 B2 * | 11/2014 | Zuckerman | ......... | H04L 25/0266 375/219 |
| 8,917,781 B2 * | 12/2014 | Murase | .................. | G08C 19/12 375/257 |
| 8,917,782 B2 * | 12/2014 | Wang | ...................... | H04B 3/46 375/257 |
| 8,917,793 B2 * | 12/2014 | Mori | ...................... | H04B 1/74 375/212 |
| 9,148,320 B1 * | 9/2015 | Pelletier | .................. | H04L 25/08 |
| 9,312,916 B2 * | 4/2016 | Dardenne | ............. | H04M 3/306 |
| 2002/0065631 A1 * | 5/2002 | Loechner | ........... | G05B 19/4185 702/188 |
| 2002/0120880 A1 * | 8/2002 | Simon | .................... | H04L 7/0008 713/400 |
| 2002/0150116 A1 * | 10/2002 | Huang | ................... | H04B 3/548 370/431 |
| 2005/0085259 A1 * | 4/2005 | Conner | .................. | H04B 3/542 455/552.1 |
| 2005/0160208 A1 * | 7/2005 | Hampel | .................. | G06F 13/37 710/117 |
| 2005/0253621 A1 * | 11/2005 | Gamble | .................. | H04L 25/08 326/30 |
| 2006/0034364 A1 * | 2/2006 | Breitzmann | ...... | H02M 7/53871 375/238 |
| 2008/0191702 A1 * | 8/2008 | Coenen | ............. | G01R 31/3662 324/434 |
| 2010/0220828 A1 * | 9/2010 | Fuller | ................. | H03F 3/45179 375/355 |
| 2011/0316549 A1 * | 12/2011 | Coenen | ................ | G01R 31/026 324/434 |
| 2013/0127419 A1 * | 5/2013 | Peter | ...................... | H02J 7/0018 320/119 |
| 2013/0215983 A1 * | 8/2013 | Fornage | .................. | H04B 3/54 375/257 |
| 2014/0161201 A1 * | 6/2014 | Yukizane | ............... | H04B 3/548 375/257 |
| 2014/0301491 A1 * | 10/2014 | Yamamoto | ............. | H04B 3/548 375/257 |
| 2014/0369431 A1 * | 12/2014 | Ma | ...................... | B60L 11/1816 375/257 |
| 2015/0063473 A1 * | 3/2015 | Nishibayashi | ......... | H04B 3/542 375/257 |
| 2015/0155911 A1 * | 6/2015 | Chen | ........................ | H04B 3/02 375/257 |
| 2015/0229357 A1 * | 8/2015 | Range | .................... | H04B 3/54 375/257 |
| 2015/0244420 A1 * | 8/2015 | Matsudaira | ............. | H04B 3/54 375/257 |
| 2015/0263785 A1 * | 9/2015 | Farrokhi | .................. | H04B 3/54 375/257 |
| 2015/0381237 A1 * | 12/2015 | Griffith | .................. | H04B 3/546 375/258 |
| 2016/0119168 A1 * | 4/2016 | Roy | ........................ | H04B 1/04 375/238 |
| 2016/0149733 A1 * | 5/2016 | Criminale | ........... | H04L 25/4902 375/238 |

OTHER PUBLICATIONS

Written Opinion dated Jan. 30, 2015, for PCT/EP2014/073033.
European Search Report dated Mar. 13, 2014, for EP 13190394.0.
International Preliminary Report on Patentability (IPRP) dated May 6, 2016, for PCT/EP2014/073033.

* cited by examiner

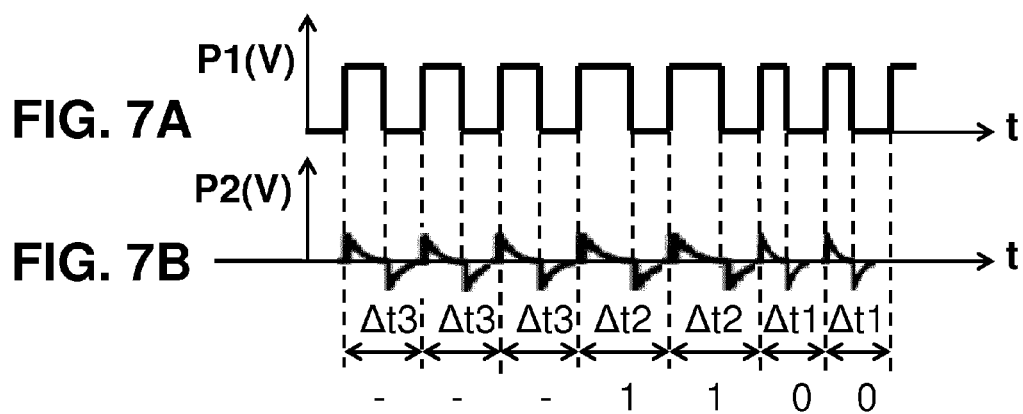
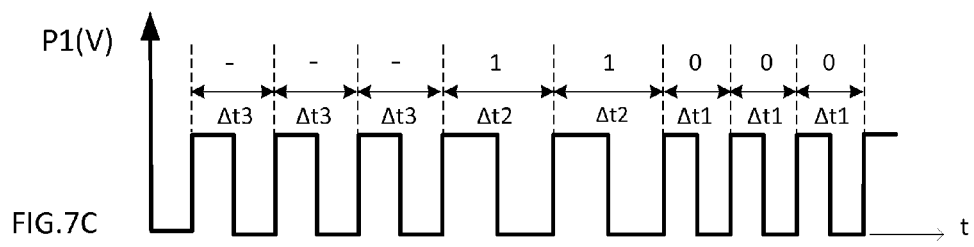
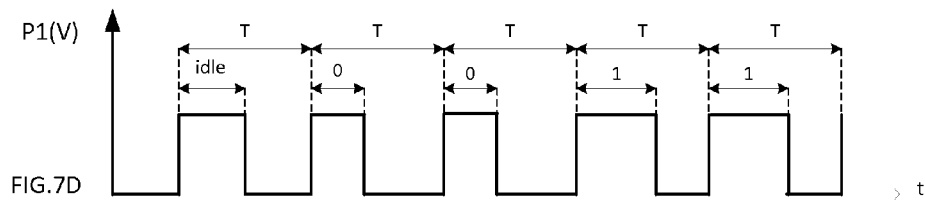
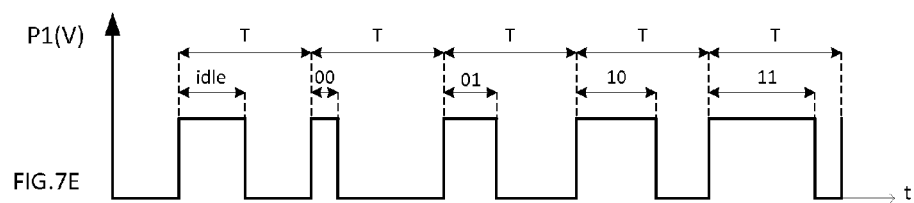

US 9,768,978 B2

METHOD AND SYSTEM FOR PROVIDING PULSED POWER AND DATA ON A BUS

The invention relates in general to the field of methods and systems for providing pulsed power and data from a main control unit (master) to at least one slave unit (slaves) via a bus. More specifically the invention relates to such systems where the master and slaves are galvanically decoupled, e.g. to a rechargeable energy storage systems comprising a plurality of rechargeable cells.

BACKGROUND OF THE INVENTION

Several techniques for communicating power and data over a single bus are known in the art. A well-known example is "Power Line Communication" (PLC) where data is carried on electrical conductors that are simultaneously used for carrying AC electrical power. A specific example is "Homeplug", which is the family name for various power line communication specifications that support networking over existing home electricity wiring. Characteristic to such systems is that the power is a low-frequency AC signal (e.g. 220 V at 50 Hz), and that the data-information is superimposed at the transmitter side as a high-frequency signal (e.g. up to 30 MHz), which data-signal can be separated from the power-signal by appropriate filter-techniques at the receiver side. A disadvantage of such a system is that it requires a modem at each transmitter and receiver side, which makes this system prohibitively expensive for some applications, and requires extra board space (as compared to systems not requiring a modem). Another disadvantage is that the devices connected to the bus are galvanically coupled to the bus, unless a transformer is used, which again makes the slave units, and thus the system bulky and expensive.

FR2612019A1 discloses a system including a two-line bus, e.g. a shielded twisted pair, and several units connected to the bus. The bus is equipped with a general supply transformer, and each unit of the system is coupled to the bus by a first transformer. Each unit is also coupled to the bus by an isolating transformer with ferrite core, intended for transferring digital signals between bus and unit. A disadvantage of such a system is that each unit requires a first transformer for receiving power, and an isolating transformer with a ferrite core for the data-communication. That makes the units, and thus the system bulky, heavy and expensive.

WO2011/036147 describes a system for balancing charge over a plurality of rechargeable energy storage devices 12, e.g. battery cells, coupled in series, as illustrated in FIG. 1. The slave devices (here: balancing units 15) are galvanically separated from the power-bus 30 by means of series capacitors 19. The data communication between the slaves and the main control unit 20 occurs on a separate bus 40, e.g. a CAN bus. As the slaves 15 are at different potentials, they cannot be connected directly to the CAN-bus, but e.g. may be connected thereto by means of interface devices using opto-coupling, which requires board space and increases the component cost.

FIG. 1 shows a system 13 for recharging a plurality of battery cells 12, connected in series to form a string 11, each cell 12 being controlled by a balancing unit 15. The main control unit 20 of this system comprises an AC signal generator 14 for providing power pulses on the bus 30, which are provided to the slave units 15 through series capacitors 19. A portion of that power is used for the local power supply 22 of the slave unit, see FIG. 2, for powering a local micro-controller 18. The micro-controller 18 is arranged for opening and/or closing switches SW1, SW2 for charging and/or discharging the corresponding battery cell 12. Another portion of the power pulse is used for charging or discharging the corresponding battery cell 12. The micro-controller 18 can measure e.g. the voltage of the battery cell 12 by measuring the voltage difference over the pins S+ and S− by means of an internal A/D convertor 21. Via a second bus 40, separate from the power bus 30, the main control unit 20 can send commands to each of the slave units 15, e.g. to instruct a particular slave unit to measure the cell voltage of the corresponding battery cell 12, and when the value is measured and digitized by means of an A/D convertor 21, this particular slave unit can send the measured voltage value via the data bus 40 to the main control unit 20. The interested reader is kindly referred to EP2302757A1 for more details.

The second bus 40 can e.g. be a (well known) CAN bus. However, as the slave units 15 are connected to the storage elements 12, which are connected in series, the slaves 15 are at different potentials, and therefore they cannot be connected directly to the second bus 40, but need to be connected via galvanic separation means, such as e.g. opto-coupling.

FIG. 2 shows one of the balancing units 15 of the rechargeable energy storage system of FIG. 1 in more detail. As the control and purpose of the switches SW1 and SW2 is described in EP2302757A1. Node "P", is where power is injected from the power bus 30 via the series capacitor 19, and the node "C" is the node through which the micro-controller 18 and the main control unit 20 can communicate via the second bus 40. The communication interface is not described in detail in EP2302757A1.

There is a need for another method and system for providing power and data on a bus.

SUMMARY OF THE INVENTION

It is an object of embodiments of the present invention to provide an alternative method and system for addressing individual slaves connected to a main control unit.

This objective is accomplished by a system and a method according to embodiments of the present invention.

In a first aspect, the present invention provides a system for providing power and data signals from a main control unit to at least one slave unit via a first bus; the main control unit comprising a first AC signal generator adapted for providing a first AC signal comprising a plurality of first pulses for providing power to the at least one slave unit via the first bus; each slave unit being AC-coupled to the first bus by means of a first series capacitor (or capacitive circuit, or capacitive device), each first series capacitor (or capacitive circuit, or capacitive device) being arranged for converting the first pulses provided at its input into second pulses at its output; the main control unit being adapted for sending data to the at least one slave unit by modulating the plurality of first pulses; the at least one slave unit being adapted for receiving the data by demodulating the plurality of second pulses. The pulses are preferably block or square-wave pulses as the electronic components therefor are economical to purchase. Embodiments of the present invention modulate and demodulate sequences of pulses using methods for converting a data signal to be transmitted into a pulse train. The pulses may be binary pulses, i.e. they have a "high" and a "low" value. The master unit includes pulse generator and a transmitter to transmit the modulated pulses and the slave has a receiver. The pulses can be binary pulses and the master has a binary pulse generator and transmitter, and the receiver has a binary pulse demodulator. The data information can be carried on a detectable characteristic of the pulses, such as the amplitude of a signal, or the information can be carried along the time axis of the signal. Embodiments of the present invention can make use of pulse amplitude modulation, pulse position modulation (PPM), pulse width modulation (PWM), pulse frequency modulation (PFM), pulse interval modulation (PIM), Pulse Count Modulation etc. In particular the pulses have at least one edge or flank. The pulses can have a rising or falling edge or flank which can be used as a reference point in a demodulation of the data information from the received signal. A pulse amplitude or a time difference between pulse edges or flanks can be associated with a bit value which is one part of the data information received. In a preferred embodiment, the pulse edges or flanks may be a first pulse edge or flank on one pulse and a second pulse edge or flank on a second pulse. The pulse edges or flanks may be rising edges or falling edges, whereby leading edges are preferred. The pulse edges or flanks may be a first pulse edge or flank on one pulse and a second pulse edge or flank on the same pulse. This defines a width of the pulse.

Alternatively pulse trains may be received at the slave unit and can be counted, whereby the count number is associated with a certain bit value. A particular high state of the pulse or low state of the pulse (e.g. of a certain length that distinguishes can be used as a stop signal and/or start signal for the counting.

As well as or instead of transmitting data and power from a master unit to a slave unit, the systems of the present invention may transmit data information from a slave to a master, whereby similar pulse trains can be used. For example the communication may be time divided, i.e. a time period is allocated for data to be sent from the master to the slave unit and another time period is allocated for the slave to send data to the master unit and/or to other slave units.

It is noted that instead of a single first series capacitor associated with a slave unit, also a combination of capacitors, e.g. two or more series capacitors, may be used. For example a circuit of components that provide a capacitance value to the circuit can be used. The circuit or individual capacitor may be described as a "capacitive device" or a "capacitive circuit" meaning a device or circuit which possesses a capacitance value and acts like a capacitor, i.e. that it blocks a DC voltage signal and allows through an alternating signal such as a square wave—although the signal after passing the D blocking capacitor may be distorted.

According to this embodiment, power pulses and data are provided on the same bus, i.e. on the same physical conductor, e.g. wire.

In an embodiment, the system comprises only one slave unit. In another embodiment, the system comprises a plurality of slave units connected to the first bus, for example two slave units (uniquely addressable by 1 bit), or from three to four slave units (uniquely addressable by 2 bits), or from five to eight slave units (uniquely addressable by 3 bits), or more than eight slave units. It is an advantage of the power-and-data-bus that a single bus can be used to provide power and data to all the slave units. In this case, the protocol may use e.g. broadcast-commands (i.e. commands intended for all slaves), or may send specific commands to address only one or a subset of the slaves.

By coupling the at least one slave unit to the first bus via a first series capacitor or first capacitive circuit or first capacitive device, the at least one slave unit is galvanically separated from the first bus. This may be useful in applications where contactless power and data-transmission is required, e.g. in medical applications for establishing communication between a master device outside of the body and an implanted device, e.g. for releasing a medicament, or in systems having a large number of slaves at a different potential (e.g. in a rechargeable energy storage system comprising a string of rechargeable energy storage devices coupled in series), or in metering systems for safety-reasons.

It is known in the prior art to send power and data on a single bus, by superposition of a data signal and a power signal. However, as far as known by the inventor, no prior art circuits exists for providing pulsed power and data over a single bus, by modulating the pulsed power signal itself, in combination with AC-coupling through a series capacitor, capacitive circuit or capacitive device. A possible explanation may be because the signal at the output of a series capacitor can be heavily distorted, and therefore assumed to be difficult to be used as a baseband data signal. However, the inventors have found that such a distorted signal can still be used for effectively providing both power and data. One of the enabling factors for the present invention is (1) the availability of small programmable micro-controllers at an economical price, which allows a square or block-wave with varying modulation characteristics, such as timing characteristics, to be easily generated, and (2) this allows digital processing of an incoming distorted signal (e.g. to detect a characteristic of the pulses such as to detect the time instance of arrival of the rising edge, a frequency change, a special stop pulse, etc). It should be mentioned, however, that capacitive coupling typically work less well for long lines (e.g. longer than 20.0 m), but this technique is very well suitable in applications like energy storage systems such as e.g. battery packs having outer dimensions smaller than e.g. 5.0 m, preferably smaller than 3.0 m.

One of the main advantages of embodiments of the present invention is that the present system can be built by means of very simple hardware for transmitting data (by the main control unit) and receiving the data (by the slave), as opposed to the prior art circuits, which either don't provide galvanic separation, or require more complicated hardware, such as e.g. described in FR2612019(A1), where the master unit and each slave require a transformer, which is heavier, and more bulky and more expensive than a capacitor. Cost is a very important factor in systems where a plurality of slave units are required, such as e.g. in a rechargeable battery system with multiple balancing units.

Different kinds of first pulses may be applied, e.g. rectangular pulses, triangular pulses, pulses with a trapezoidal shape, etc. but square-wave or rectangular pulses are preferred due to the simplicity of the electronic components that can be used. And the pulse waveforms can be modulated in several ways, e.g. by pulse amplitude modulation, pulse count modulation, pulse width modulation (PWM) or pulse position modulation (PPM), etc., each of which is an embodiment of the present invention.

By using a bus, the power and data can be delivered to a plurality of slave units with a reduced number of wires, as compared to the case where the main control unit is connected to each of the slave units individually.

It is an advantage of embodiments of the present invention that the power pulses are modulated themselves for transmitting the data, because it allows data to be sent at the same time as power is being sent, as opposed to systems that use separate data pulses and separate power pulses, e.g. in an interleaved manner. If the power supply (providing the power pulses) is not interrupted during data-communication, less decoupling is required in the slave units.

In an embodiment of the system, the main control unit is adapted for providing the first AC signal such that the first pulses have a rising or falling edge; the main control unit is adapted for sending the data by changing a characteristic of these pulses such as amplitude or the time distances between the rising (or falling) edges of consecutive first pulses or rising and falling edges of one pulse; at least one slave unit is adapted for receiving the data by determining the characteristic of these pulses such as amplitude or the time distances between edges, e.g. between the rising (or falling) edges of consecutive second pulses, or the rising and falling edges of one pulse, and for translating the determined time distances to corresponding data-symbols.

By detecting only the rising (or falling) leading edges of the pulses, additional circuitry for detecting the negative edges, which on the second pulses may assume a negative voltage level, can be omitted. This further simplifies the detection circuit. The time distance is preferably measured between the rising (or falling edges) edges of successive pulses.

In embodiments of the present invention, the position of the negative edge need not be important for the data communication. If all pulses have the same waveform (in particular, same width), this modulation is known as Pulse Position Modulation, but that is not absolutely required in the present invention, and the width of the pulses may be constant or may vary.

In an embodiment, the first AC signal generator is adapted for generating substantially rectangular pulses.

Substantially rectangular (first) pulses can be easily generated, e.g. by means of a switch and a constant DC current source or a flip-flop circuit. The timing of such pulses can be easily determined by opening and closing the switch at proper time instances. At the transmitter side, such time instances can be easily generated by using a timer interrupt of a microprocessor. At the receiver side, the time distances between rising (or falling) edges can be easily measured by using an input-pin having interrupt capabilities such that an interrupt is automatically generated at a rising edge of the signal at the input pin. This requires only a small, e.g. minimal amount of processing power, both at the transmitter and receiver side, and may be implemented by existing microprocessors, e.g. low cost microcontrollers.

In an embodiment, the main control unit and the at least one slave unit are adapted for applying resp. detecting at least a first and a second predetermined timing of edges e.g. the time distance corresponding to a first resp. a second data symbol.

For example, the first data symbol could be a zero-bit '0' and the second data symbol could be a one-bit '1'. In this case the signal generator would send one data-bit along with each power pulse. For example, if the AC signal is a 10 kHz (modulated) pulse-train, then the raw data-rate on the bus (i.e. including protocol overhead) would be 10 kbits/s. The net data-rate that can be sent by the master unit to the one or more slaves, depends on the protocol being used. As is well known in the art, in case no net data is to be sent, the AC signal generator may send e.g. "dummy packets" on the bus.

In an embodiment, the main control unit and the at least one slave unit are adapted for applying resp. detecting at least a first, a second, a third and a fourth amplitudes or timings of edges, e.g. time distances, corresponding to a first, resp. second, third and fourth data symbol.

In this case the signal generator would send two data-bit along with each power pulse. For example, if the AC signal is a 10 kHz (modulated) pulse-train, then the raw data-rate on the bus (i.e. including protocol overhead) would be 20 kbits/s. The invention is however not limited to only one or two data-bits per symbol, and more than two data-bits, e.g. three or four, or even more than four bits/pulse may also be used.

In an embodiment, the main control unit and the at least one slave unit are adapted for applying resp. detecting at least a first, a second and a third amplitude or tiling of edges such as time distances corresponding to a first, resp. a second and a third data symbol, the third data symbol being a dummy data symbol.

For example, the first data symbol could be a zero-bit '0' and the second data symbol could be a one bit '1', and the dummy data symbol could be a dummy bit. In this case the signal generator could apply the third timing or amplitude or time distance between power-pulses, when no data is to be sent, only power. Such a protocol may have the advantage that the decoding process at the receiver side is simpler, and may require less processing power, since no dummy data needs to be processed. Such embodiments may also be more robust to framing errors, e.g. when the dummy data are sent between different packets.

If for example data is sent in frames or series or commands of 8 bits each, then the dummy-data-symbol may be used e.g. as a command separator (like a start-bit), or as a clock-signal. But the protocol may also use less than 8 bits per frame, or more than 8 bits per frame.

In an embodiment, the system is a rechargeable energy storage system comprising a string of rechargeable energy storage devices coupled in series, and each slave unit is a balancing unit for charging or discharging one of the rechargeable energy storage devices.

In this example, the power placed on the first bus is primarily intended for loading the rechargeable energy devices (e.g. battery cells), and only a fraction of the power injected on the first bus is used by the balancing unit itself (e.g. for controlling switches, for measuring the voltage, for communicating).

In an embodiment, the system further comprises a second bus, connected between the main control unit and the at least one slave unit by means of a galvanic decoupling element for communicating data from the at least one slave unit to the main control unit.

The second bus may be distinct from the first bus. Preferably the second bus is connected to all slave units. The data-communication on the first bus would typically be called "down-link", while the data-communication on the second bus would typically be called "up-link".

The second data channel could be e.g. an I$^2$C bus, or a CAN-bus, or any other uni-directional or bi-directional bus known by the skilled person, (although this bi-directional bus may only be used in a single direction, i.e. from the slave to the main unit in certain embodiments), and the galvanic decoupling element could be e.g. an opto-decoupling element having a I$^2$C bus interface or a CAN-bus interface, or the like.

Such an embodiment would allow the one or more slave unit to communicate back to the main control unit. For example, in case of a rechargeable energy storage system having a plurality of slave units, the slave units could communicate the voltage level of the corresponding energy cell to the main control unit.

This embodiment offers the advantage that bi-directional communication is possible (from main unit to slave units over the first bus, and from slave units to the main unit over the second bus) with galvanic separation, without having to use opto-coupling in both directions: from the main control unit to the slave unit(s) and back.

In an embodiment, the at least one slave unit is adapted for sending data to the main control unit over the second bus, for instance synchronously with the first AC signal.

In synchronous embodiments, one of the slaves would place data (e.g. one bit) on the second bus (e.g. via an opto-coupler), shortly (e.g. immediately) after detecting the rising edge of a power pulse.

Pulse-position-modulation (PPM) may be used both on the first bus and on the second bus, but that is not absolutely required, e.g. the second bus may also use another type of modulation, such as e.g. pulse-width-modulation (PWM), pulse amplitude modulation or pulse count modulation. However, in some of these cases the main unit has to be able to detect both the rising edge and falling edge of the pulses sent by the slave units.

The shape of the pulses sent by the main unit and of the shape of the pulses sent by the slaves need not be the same. For example, the pulses sent by the main unit may be triangular and the pulses sent by the slaves may be rectangular, but it is preferred that rectangular pulses are sent by both the main unit and the slaves.

In some embodiments of the system, no actual data is sent by the main control unit and any of the slave units at the same time. In the example above with three predefined time-differences, the third time-distance corresponding to "no-data" may be used on the down-link at the moment when one of the slaves is communicating via the up-link channel. By continuing to send pulses from the main unit, with/without data, all units can easily and efficiently remain synchronized, e.g. by counting the pulses, and data-collision from the slaves can be avoided. The data-rate on the second bus can be increased as compared e.g. to using an RS232-timing-protocol.

In an embodiment of the system with a second bus, the galvanic decoupling element is a second series capacitor capacitive circuit or capacitive device; the at least one slave unit is adapted for providing a second AC signal comprising a plurality of third pulses having a rising edge (or falling edge) to the second series capacitor, capacitive circuit or capacitive device, whereby the amplitude or timing of edges e.g. the time distances between the rising edges (or falling edges) of consecutive third pulses are modulated according to the data to be sent from the slave unit to the main control unit; the main control unit is adapted for detecting the amplitude or timing of edges e.g. the time distances between the rising (or falling) edges of fourth pulses originating at an output of the second series capacitors, capacitive circuits or capacitive devices when the third pulses are applied to its input.

In a first example of this embodiment, the second bus and the first bus are one and the same bus, and the second and first capacitors, capacitive circuits or capacitive devices are one and the same capacitors, capacitive circuits or capacitive devices. In this example a single bus is used to transfer power and/or data from the main control unit to the slaves, and data from the slaves to the master. The data from the slaves may e.g. be put on the bus, when the main control unit is silent. The data from the slaves may e.g. be interleaved between commands sent by the main control unit, e.g. during a relatively short or a relatively long period during which the main control unit is not putting power pulses on the bus. Using a single bus for power and forward and backward communication, offers the advantage of requiring only a single bus (hence the advantages of less wires, less handling, less connections, lower cost).

In another example of this embodiment, the first bus and the second bus are distinct from each other. This offers the advantage that the forward and backwards communication may occur in parallel, and that no power pulses occur on the second bus, which may allow simpler and cheaper implementation, in hardware, e.g. because lower amplitudes may be used for the pulses sent by the slaves, and/or less disturbance occurs on the busses, and/or less capacitive decoupling required for the slaves because the power delivery over the first bus may continue, and/or less data buffering may be required, and/or in software, e.g. simpler protocol. In either case, the back-communication (from the slaves to the main control unit), whether sent on a single bus (between bursts of power pulses) or on a separate second bus, may occur on substantially the same clock frequency as the frequency of the first AC signal, or on a different clock frequency.

Using second series-capacitors, capacitive circuits or capacitive devices offers the significant advantage that no opto-coupling units are required at all, not in the down-link channel and not in the up-link channel. This saves cost, saves board space, reduces labor, and increases reliability (having the advantage of less components).

The amplitudes, pulse counts or duration of the predefined time distances (or pulse-widths or the like) for each data symbol, e.g. '0' or '1' used by the slave units for sending data, may be the same as, or different from the amplitudes, pulse counts or duration of the time distances used by the main control unit when sending data. The number of bits per pulse used for the down-link-communication may be the same as, or different from the number of bits per pulse for the up-link communication.

According to a second aspect, the present invention provides a method for providing power and data signals from a main control unit to at least one slave unit via a first bus, the at least one slave unit being AC-coupled to the first bus by means of one or more series capacitors, capacitive circuits or capacitive devices, the method comprising the steps of: a) providing combined power and data signals from the main control unit to the at least one slave unit by generating a first AC signal comprising a plurality of first pulses, and by applying the first AC signal to the first bus; b) receiving the first pulses at the input of the one or more series capacitors, capacitive circuits or capacitive devices, and providing second pulses at the output of the one or more series capacitors, capacitive circuits or capacitive devices; c) sending the data from the main control unit to the at least one slave unit by modulating the plurality of first pulses; d) receiving the data in the at least one slave unit by demodulating the plurality of second pulses. Preferably the at least one slave unit is a plurality of slave units, all being connected to the first bus.

In an embodiment of the method, the first AC signal is generated such that the first pulses have a rising (or falling) edge; the modulation of the first pulses is done by changing the time distances between the rising (or falling) edges of the same or consecutive first pulses; the demodulation of the second pulses is done by detecting the time distances between the rising (or falling) edges of the same or consecutive second pulses, and by translating the determined time distances to corresponding data-symbols.

In an embodiment, the first AC generator applies a first resp. second predetermined time-distance for transmitting a first resp. second data symbol; and the at least one slave unit demodulates the second pulses by measuring the time distances between the rising (or falling) edges of the same or consecutive second pulses, and by selecting one of the two predefined time distance corresponding to the measured time distance, and by translating the selected time distances to corresponding first and second data symbols.

Selecting the "corresponding" predefined time distance is typically performed by calculating the difference between the measured time distance and each of the predefined time distances corresponding to the data symbols, and by selecting the one with the smallest absolute difference value, but other techniques may also be used.

In an embodiment, the first AC generator applies a first, resp. second and third predetermined time distance for transmitting a first, resp. second and third data symbol, e.g. '0', '1', 'x', the third data symbol being a dummy data signal; and wherein the at least one slave unit demodulate the second pulses by measuring the time distances between the rising (por falling) edges of the same or consecutive second pulses, and by selecting one of the first, second and third predefined time distances corresponding to the measured time distance, and by translating the selected time distance to corresponding first, second and third data symbols, the third data symbol being a dummy data signal.

In an embodiment, the at least one slave unit is furthermore communicatively coupled to a second bus by means of a galvanic decoupling element, and the method furthermore comprising the steps of communicating data from one of the slave units via the second bus to the main control unit, synchronously or asynchronously with the first AC signal.

When using an opto-coupler as the galvanic decoupling element, the data output of the slaves is not distorted, and the main unit can easily detect rising and falling edges of rectangular pulses sent by the slaves. In this case the slaves can use e.g. pulse-position-modulation or pulse-width-modulation or RS-232 modulation.

When capacitive coupling is used for communication from the slaves to the main unit, the signals may be distorted. If the slaves send rectangular pulses and use pulse-width-modulation (PWM), the main unit will have to be able to detect both rising and falling edges for decoding the data. If the slaves use pulse-position-modulation (PPM), the main unit only needs to detect the rising edges. Other modulations can be used such as amplitude modulation or pulse count modulation.

The slave units may use the same (or substantially the same) clock frequency for sending data as was used for the first pulses, but that is not absolutely required, and the slave units may also use an unrelated clock frequency, for example based on a local oscillator. The clock frequencies of the different slaves should, however, be substantially the same.

It is an advantage of using synchronous communication, that the data-rate can be much higher than with the asynchronous communication.

By using an appropriate protocol, collision of messages on the back-channel can be avoided. Several protocols are possible, e.g. a protocol where the master first sends a message or command to one particular slave, where after that one slave is given time to respond on the second bus. When the first slave has sent its data, the master addresses the next slave, etc. But other protocols can also be used.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 7A shows an example of a pulsed power waveform comprising first pulses having a rising edge, whereby the distance between the rising edges of the first pulses is modulated according to data being transmitted from the main control unit (master) to the slave units.

FIG. 7B shows an example of second pulses obtained at the output of the circuit of FIG. 6, when the waveform of FIG. 7A is applied to its input.

FIG. 7C illustrates a further embodiment of pulsed power waveforms

FIG. 7D to FIG. 7H illustrate further embodiments of pulsed power waveforms.

Figure 1:
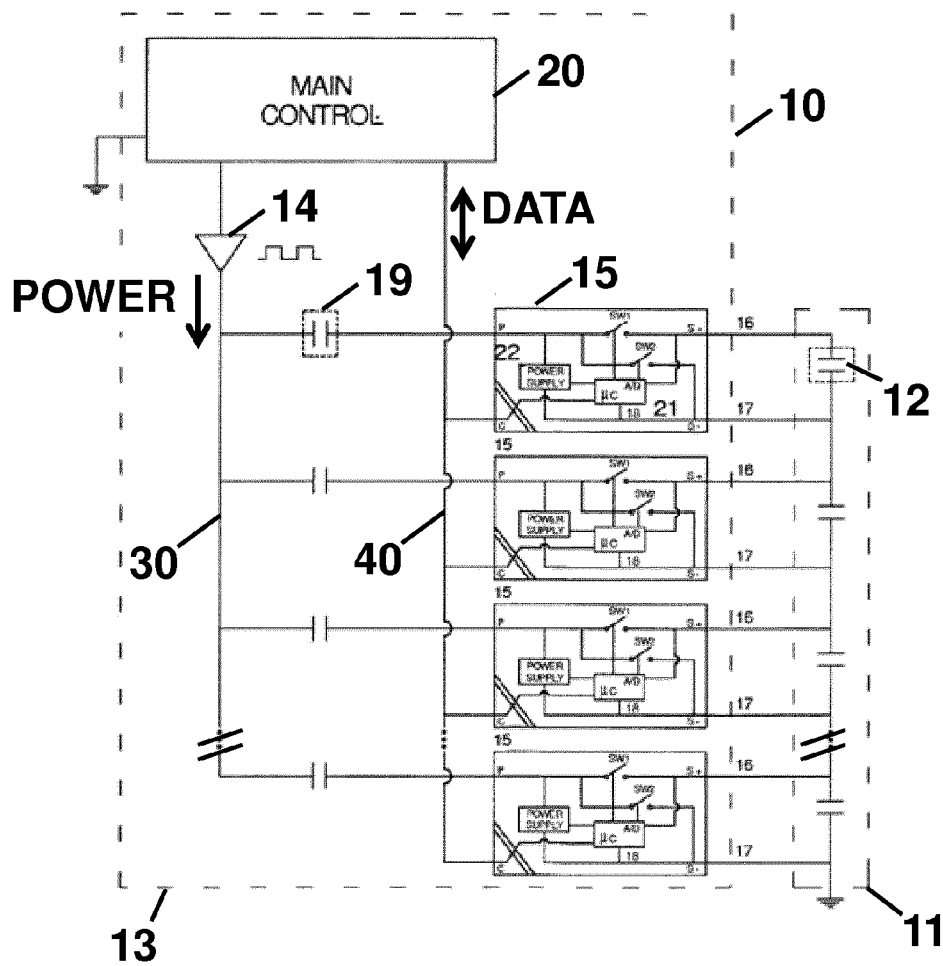
FIG. 1 shows a rechargeable energy storage system comprising a plurality of rechargeable cells connected in series, as known in the art.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in one or more embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When in the present document reference is made to "data", reference is made to any kind of data, including e.g. payload data, address information, commands, etc. How the data is interpreted, is a matter of the communication protocol used between the main control unit and the slave units. Although some aspects of a possible protocol will be described in more detail, the invention is not limited thereto, and other protocols can be used as well.

When in the present document reference is made to "rise time" of a "rising edge" of a signal changing from a "low" voltage level to a "high" voltage level, reference is made to the time taken by the signal to change from a 10% value to a 90% value of the step from the low to the high level. For example, where the pulsed signal is a rectangular block-wave with a 12 V amplitude (varying between 0 V and 12 V), the rise time is defined as the time required for the signal to change from 1.20 V to 10.80 V.

Where embodiments are described using rising edges these may also be implemented using falling edges. Leading edges can be preferred to trailing edges when determining timings.

Embodiments of the present invention can be used with energy storage systems but the present invention is not limited to energy storage systems alone, but can also be used in other applications where a main control unit is to provide power and data to one or more slave units, while being galvanically separated therefrom. The principles of the present invention may for example also be used in medical applications, where one or more slave devices are implanted in a body, and where a main control unit, external to the body, provides power and data to the slave devices via capacitive coupling. Another application may be an access-control system, whereby the main control unit is part of a badge reader, and the slave units are part of an access card.

First Embodiment

FIG. 3 to FIG. 7 will be used to explain the main principles of an embodiment of the present invention.

Figure 3:
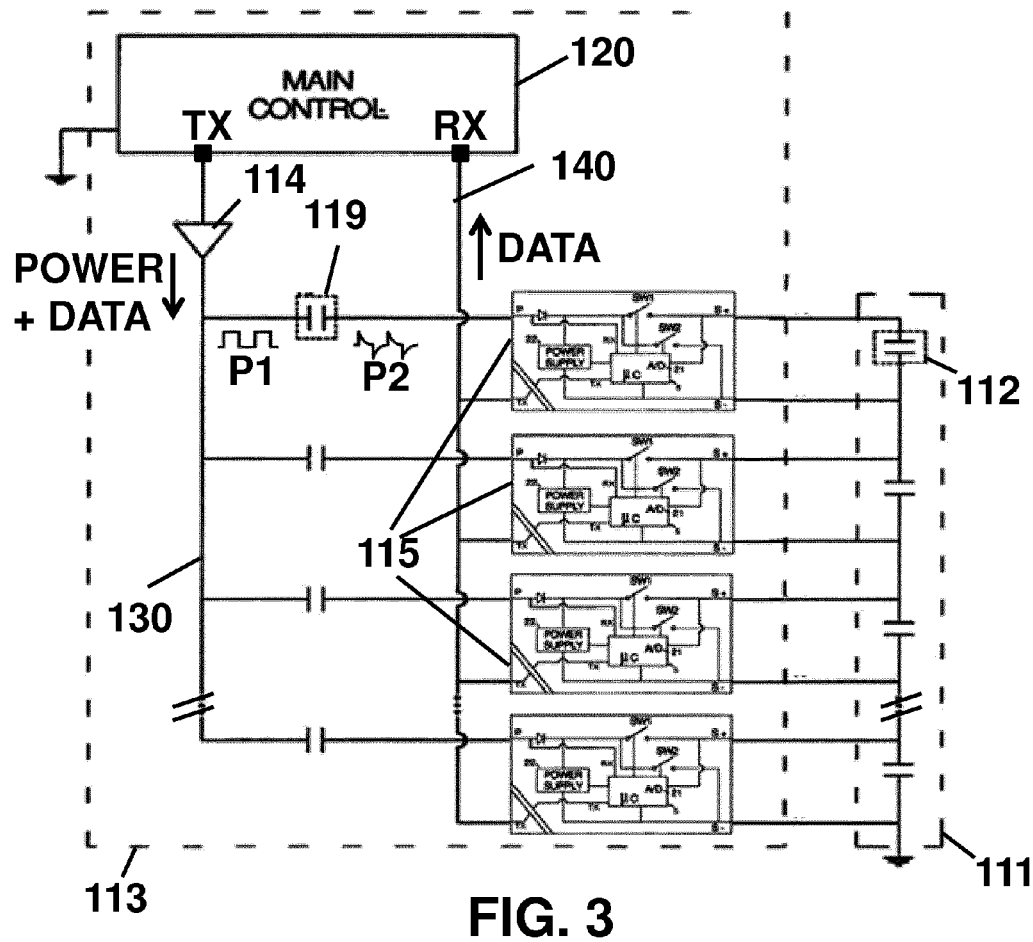
FIG. 3 shows a rechargeable energy storage system according to embodiments of the present invention.

FIG. 3 shows a system 113 according to aspects of the present invention. The system 113 is a variant of the energy storage system 13 of FIG. 1, but this is not intended to limit the invention to energy storage systems. When comparing the block-diagram of FIG. 3 with that of FIG. 1, it becomes immediately clear that the main difference between both systems 113, 13 is that the data from the main control unit 120 to the one or more slave units 115 occurs over the first bus 130 instead of over the second bus 140, as indicated by the arrows "power and data" and "data". While not directly evident from FIG. 3, this offers the important advantage that the second bus 140 can now be uni-directional instead of bi-directional. When using opto-couplers, this means that one of the two opto-couplers (one for each direction) can be omitted per slave 115. This is a major advantage in terms of board space and component cost, especially in systems such as energy storage systems having a plurality of slaves, e.g. having at least eight, or at least sixteen, or at least thirty-two slaves, or even more. In addition, the traffic over the second bus 140 is reduced (as compared to the system 13 of FIG. 1), which may allow for using slower interfacing devices, e.g. slower opto-couplers, which may further decrease the component cost. This may also reduce noise, EMC and EMI problems, and thus increase system reliability.

An important aspect of the present invention, is how both power and data can be transmitted over the same bus 130, which bus is galvanically decoupled from the slaves 115 by means of series capacitors 119, as will be described next.

Figure 2:
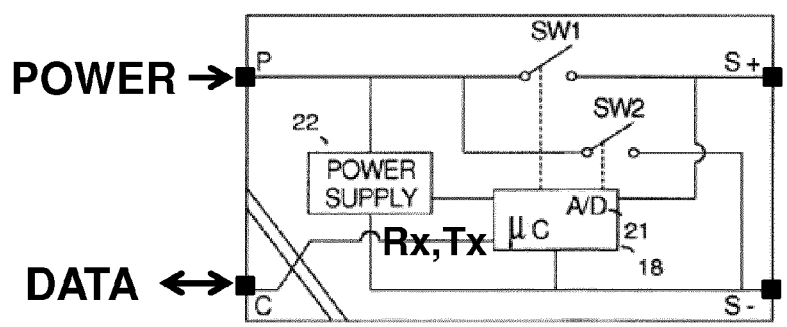
FIG. 2 shows one of the balancing units of the rechargeable energy storage system of FIG. 1 in more detail.
Figure 4:
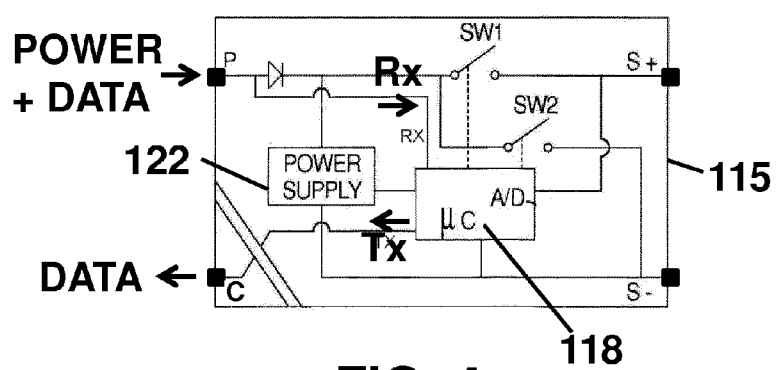
FIG. 4 shows an enlarged block-diagram of an example of a slave unit as can be used in the system of FIG. 3.

FIG. 4 shows an embodiment of a slave unit 115 as can be used in the energy storage system 113 shown in FIG. 3. The power and data signal (emanating from the main control unit 120) is provided to the slave unit 115 via input note P. As explained with relation to FIG. 1 and FIG. 2, a portion of the power is used for the local power supply 122, and another portion may be transferred to an external device, in this case the battery cell 12 (not shown in FIG. 4), by controlling the switches SW1, SW2 in a similar manner as described in the prior art mentioned above. The micro-controller 118 can receive data from the main control unit 120 via the line RX, and can transmit data to the main control unit 120 via the line TX. Whereas in FIG. 2, the communication lines RX and TX both go to the node "C", in the slave unit of FIG. 4, only the line TX (for transmitting) data goes to node "C", while the line RX (for receiving data) is connected to node P. The important advantage of this difference may not be immediately apparent from the block-diagram of FIG. 4, but will become apparent from a schematic diagram, an example of which is shown in FIG. 5, although the present invention is not limited to this schematic only, but other schematics may also be used.

Figure 5:
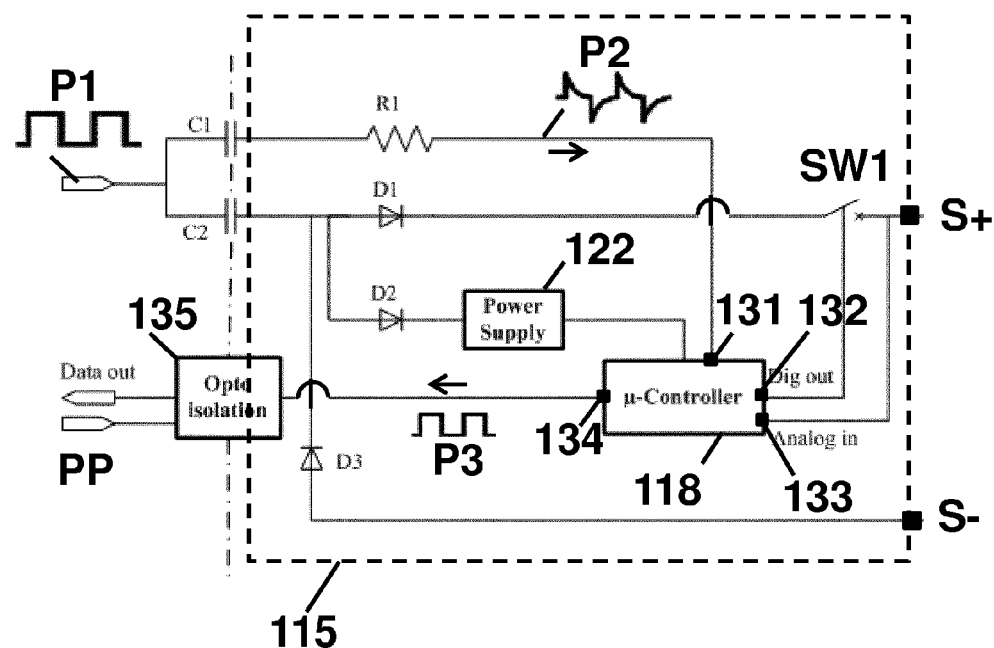
FIG. 5 shows a circuit schematic for part of the slave unit of FIG. 4, to illustrate how the communication from the slave unit to the main control unit can be established using opto-coupling devices, the second switch being omitted of the drawing for clarity reasons.

FIG. 5 shows the slave unit 115 of FIG. 4 in more detail, apart from the second switch SW2, and some decoupling capacitors, capacitive circuits, or capacitive devices, which are omitted for clarity purposes. The local power supply 122 is shown as a block-diagram, but such circuits are well known in the art, and therefore need not be shown or described in further detail here. C2 is the series capacitor (or capacitive circuit, or capacitive device) for passing the power to the local power supply 122 and for charging the battery cell 12 (not shown) while blocking the DC-component. Capacitor C2 (or capacitive circuit, or capacitive device) corresponds to capacitor 119 in FIG. 3, but as shown, a second capacitor C1 (or capacitive circuit, or capacitive device) is optionally connected in parallel to C2 for making the communication more reliable and less dependent on the state of the battery element 12 and the state of the switch SW1. If present, the value of C1 is typically a few orders of magnitude smaller than that of C2. Alternatively the capacitor C1 (or capacitive circuit, or capacitive device) may be omitted, in which case the resistor R1 would be connected to the output of C2, but in this case the communication signal would be weak in case the first switch SW1 would be closed, and the voltage of the corresponding cell 12 (not shown in FIG. 5) would be low. Adding a separate data path (through the series capacitor C1 (or capacitive circuit, or capacitive device) between the bus 130 and the slave unit 115, offers the advantage of not having to open the switch SW1 when data is to be received. This makes the communication more reliable, and also simplifies the software of the micro-processor 118. The switch SW1 can be e.g. a bipolar transistor, or a FET, or a thyristor, or any other suitable switch known in the art. An output-stage of the opto-isolation component 135 may be powered from the main control unit 120 by means of power signal PP. The micro-controller 118 preferably has at its inputs clamp-diodes (not illustrated) which prevent that the voltage level at the input pins exceeds far (e.g. more than 0.5 V) above VDD or far (e.g. more than 0.5 V) below local GND. The ground pin GND of the micro-controller 118 would typically be connected to the low voltage level of the battery cell 12 via the S− node. This allows the capacitor C1 (or capacitive circuit, or capacitive device) to be coupled via a simple resistor R1 to an input pin of the micro-controller 118 without damaging it. Due to this, the negative part of the pulses P2 would substantially disappear (on the inside of the micro-controller). If this slave unit 115 were to be used in the prior art system 13 of FIG. 1, the capacitor C1 (or capacitive circuit, or capacitive device) and the resistor R1 could be omitted, but another (uni-directional) opto-isolation component would have to be added for the data received by the micro-controller, which would occupy more board space, and increase the cost.

Figure 6:
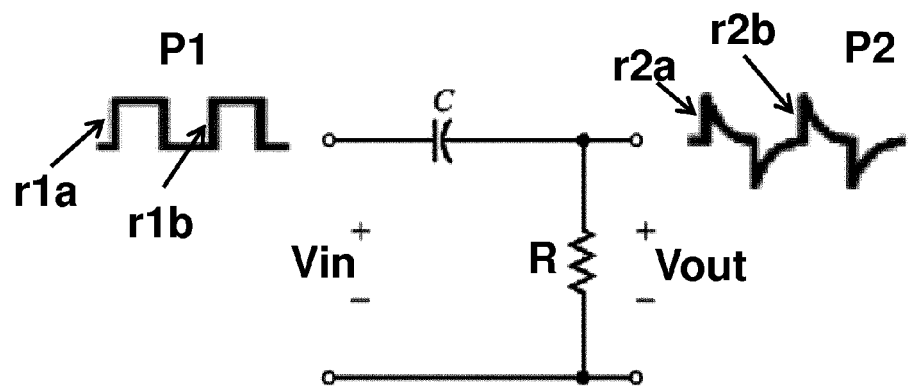
FIG. 6 is an example of a simple test-circuit known in the art, for explaining how first pulses having a rising edge (e.g. steep rising edges of rectangular pulses) are transformed into second pulses having a rising edge (e.g. a steep rising edge followed by a level decay). The rising edges of the second pulses occur substantially simultaneously with the rising edges of the first pulses.

Having described the structure of the system 113, and in particular of the slave units 115, its working will now be described referring to FIG. 6 and FIG. 7.

First, it will be explained, by means of the simple test circuit of FIG. 6, how first pulses P1, e.g. rectangular pulses, generated by the main control unit 120 and the AC signal generator 114 (see FIG. 3) are transformed (distorted) into non-rectangular second pulses P2 by the series capacitors 119 (or capacitive circuits, or capacitive devices). It is well known in the art, that rectangular pulses P1 with steep rising edges r1, are transformed by a series capacitance into second pulses P2 with steep rising edges r2 occurring substantially simultaneously with the rising edges r1 of the first pulses P1, but then decay exponentially over time. The exact size and shape of first and second pulses P1, P2 is not of prime importance for the embodiments of the present invention to work, as long as the pulses are suitable for providing a sufficient amount of power to the slave units 115, and as long as the relevant characteristic of pulses which is used for transferring information can be extracted at the slave. For example, in some embodiments the slave units 115 are able to measure a time difference between the rising edges r2a and r2b of successive pulses P2 with sufficient accuracy, as will be explained further. In the rechargeable energy system 113 of FIG. 1 and FIG. 3, the power pulses P1 are preferably rectangular pulses with a predetermined amplitude, for instance 12 V, at a predetermined frequency, for instance 10 kHz or 25 kHz, and having a predetermined duty cycle, for instance a duty cycle of about 50%. Other amplitudes larger or smaller than 12 V may however also be used, such as e.g. 5 V or about 6 V or about 24 V, and other frequencies and duty cycles, may also be used.

FIG. 7A, FIG. 7B and FIG. 7C show the principle of how data can be communicated from the main control unit 120 to the slave units 115 in an embodiment of the present invention. For example, in the system 113 of FIG. 3, there is modulation of the power pulses themselves. FIG. 7A and FIG. 7C show an example of such a series of first pulses P1, whereby the pulses have a rising edge, preferably a steep rising edge, and whereby the distance (time difference) between the rising edges of the subsequent first pulses P1 is modulated, in particular baseband modulated, according to data to be transmitted from the main control unit 120 to the slave units 115. As a modulation technique, Pulse Position Modulation, known in the art as "PPM", may be used. However, it is not absolutely required to use this technique. The waveform illustrated is a variant thereof, as in classical PPM the high-time of each pulse is equal, while that is not absolutely required for embodiments of the present invention. For embodiments of the present invention, only the position of the rising edges is important. In other embodiments the training edge may be used instead. FIG. 7A shows an example of a waveform generated by the AC signal generator 114. The master unit has a transmitter for transmitting the modulated AC signal. The AC signals can be binary signals. It should be noted that it is not absolutely required that rectangular pulses are used as the first pulses P1, and triangular pulses, e.g. from a saw-tooth waveform could also be used. However, rectangular pulses are advantageous as they are extremely easy to produce by simple electronic circuits such as a micro-controller (as part of the main control unit 120), e.g. by toggling a digital output pin between '0' and '1', and applying that to the inputs of a so called H-bridge. Such circuits are commonly used in motor control circuitry, and thus need not be described in further detail here. It is e.g. well known that the output of the H-bridge can be active "low", or active "high", or "high impedance".

FIG. 7B shows an example of second pulses P2 appearing at the output of the series capacitor 119 (or capacitive circuit, or capacitive device), when the waveform of FIG. 7A or FIG. 7C is applied at its input. The exact shape of the waveform of the second pulses P2 may deviate from the ideal waveform shown in FIG. 6, depending on the actual impedance of the circuit "behind" the capacitance (at the slave side). For example, in the circuit of FIG. 6, the impedance is a single resistor R, in which case the second pulses P2 decay as an exponential function. But in the case of the circuit of FIG. 5, the impedance is that of a more complicated circuit comprising the diode D2, the power supply 122, a switch SW1 (which may be open or closed), and optionally also the energy storage cell (not shown). However, in these embodiments by choosing a suitable modulation and demodulation technique, such as PPM, the exact shape of the second pulses P2 is less or not important, and only the position between pulse edges such as, for example, the rising edges r2a, r2b of successive pulses is important, which is the parameter being modulated.

In the example shown in FIG. 7A, FIG. 7B and FIG. 7C, the time difference Δt between successive pulses can assume one of a number of predefined values, e.g. three predefined values: when no data is sent from the master control unit 120 to the slaves 115, a third predefined time difference Δt3 between subsequent pulses is used, corresponding to "no-data" or "dummy bits". These pulses only carry power, no data. When a '1'-bit is to be sent from the master control unit 120 to the salves 115, a second predefined time difference Δt2 between subsequent pulses is used, corresponding to '1' bits. Such pulses carry both power and data information. When a '0'-bit is to be sent from the master control unit 120 to the slaves 115, a first predefined time difference Δt1 between subsequent pulses is used, corresponding to '0' bits. Also these pulses carry both power and data information. The second predefined time difference Δt2 between subsequent pulses may for instance be larger than the first predefined time difference Δt1 between subsequent pulses, and the third predefined time difference Δt3 between subsequent pulses may be smaller than the first predefined time difference Δt1 between subsequent pulses. This, however is not a requirement; the inverse may be the case, or both the second and the third predefined time difference Δt2, Δt3 between subsequent pulses may be smaller or larger than the first predefined time difference Δt1 between subsequent pulses. In an example where the frequency of the pulses on the first bus is about 25 kHz, Δt1, Δt2 and Δt3 may e.g. be chosen equal to about 35, 40 and 45 microseconds, respectively, (with a tolerance of e.g. less than 1.5 microseconds each), and may correspond to '0', '1' and no data respectively, but other values may also be used.

The above description relates to embodiments of the present invention that can be described as using a form of pulse frequency modulation (i.e. as shown in and described with respect to FIGS. 7A, 7B, 7C). Modulation is achieved by changing the period of the block wave to encode bits. One period (Δt3) signals "idle", "dummy" or "no data". Other periods signal different bit combinations of one or more bits. Demodulation is achieved by measuring the time between rising edges and relating bits values to the different time lengths.

Alternatively in further embodiments modulation may be performed by keeping the period of the pulses constant but by varying the on and off time of the block wave (FIG. 7D, FIG. 7E). This is a form of pulse width modulation. In order to demodulate, the time lapse is measured between rising and falling edges of each pulse. The components of the circuit shown in FIG. 6 are sized in order to retain measurable falling edges. Again, different bit combinations of one or more bits (FIG. E) may be encoded in order to increase bandwidth.

In accordance with further embodiments of the present invention, a combination of the two former techniques may be used, e.g. an idle signal is generated by a given period T1. These pulses transmit only power. For data a different time T2 is used (see FIG. 7F). The distinction between different data values is achieved by varying the duty cycle inside T2. This means that pulse width modulation is used inside the T2 duty cycle. Demodulation is somewhat simplified as a simple period measurement can be used to determine whether data is being sent or not. Once data reception is started demodulation is performed by pulse with measurements.

Figure 7F:
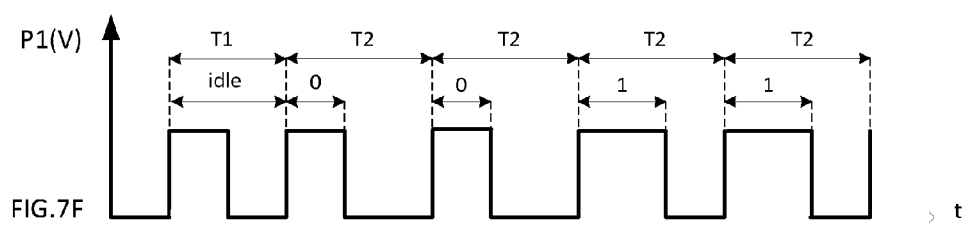
Figure 7G:
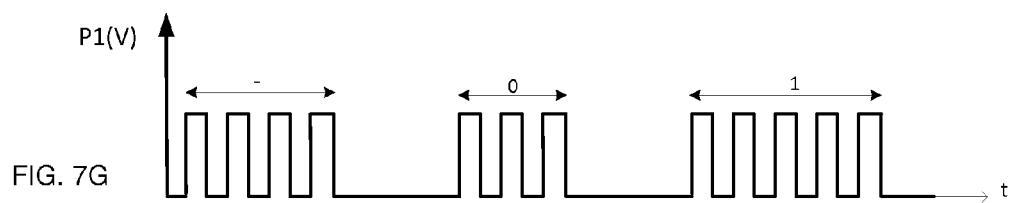
Figure 7H:
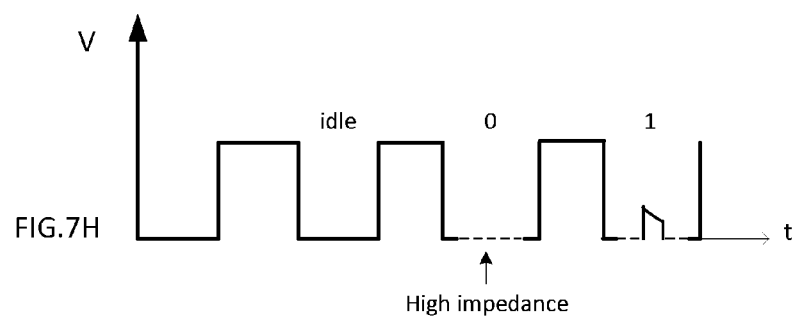

Yet another alternative embodiment of the present invention makes use of a modulation technique is shown in FIG. 7G. In this embodiment, the provision of a data signal is by making a certain number of pulses to represent a bit value. For demodulation pulses within one pulse train are counted rather than time measured. To indicate when one pulse train starts or stops a longer (see FIG. 7G) or shorter idle time can be used or a longer or shorter pulse than is used in the pulse train for counting. For example with the pulse trains shown in FIG. G a longer delay between pulses, i.e. a longer low value is used as a start/stop signal, and a simple time-out counter can be used to determine when to reset the pulse count. The advantage of this embodiment is that the carrier frequency can be increased (e.g. ×8) without the need for increased processing power at the receiver side. In this way the data bandwidth is maintained compared to previous embodiments but the power transmitted to the slaves can be increased or the coupling capacitors (319) or capacitive circuits or capacitive devices can be decreased in size.

In yet another embodiment modulation can be performed by using a block wave with more than one amplitude much in a similar manner as different periods. This is a form of amplitude modulation. In this case the modulation can be performed by switching between power supplies having different output voltages for the block wave, for example.

This requires an extra switch at the sender side. For demodulation an extra comparator may be required to determine the original amplitude.

Embodiments of the present invention can also be used for bi-directional data transmissions. For example, the slaves can generate pulses data for transmission to a master or to other slaves, e.g. in the form of a broadcast signal. For example, a high impedance state may be generated within the originally generated block wave timing or at any appropriate timeslot in any of the embodiments of the present invention, e.g. also with embodiments without stopping the block wave generation. In this case the block wave can be considered as a clock pulse train that allows synchronous communication from slave to main controller. A slave communicates by generating a different types of pulse of its own on the data line during the high impedance state (see FIG. 7H). This pulse, its position relative to the block wave and/or its length can be detected by the main controller. These parameters can be linked to bit patterns.

In any of the embodiments of the present invention the size of the decoupling capacitor at the slave unit or elsewhere can be determined in the following way with reference to FIG. 7I. The capacitor value of C1 in FIG. 5 or C in FIG. 6, for example can be calculated starting from the discharge current of the capacitor which is calculated with the formula:

$$I=U/R$$

When I is known, C can be calculated with next formula:

$$I=C*\Delta v/\Delta t$$

Figure 7I:
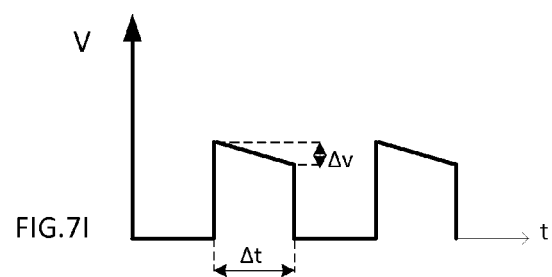
FIG. 7I illustrates how the value of a decoupling capacitor can be calculated.

FIG. 7I shows a $\Delta v$ from e.g. max 1V and $\Delta t$ is known from the generated block wave.

The micro-controller 118 of the slave units 115 can easily decode or demodulate such combined power and data signal, e.g. by using an input pin which automatically generates an interrupt on a rising edge, and the micro-controller only needs to determine the time interval between subsequent pulses, e.g. by measuring a time-value (or counter-value) when the first pulse occurs, and measuring a time-value (or counter value) when the second pulse occurs, and then calculating the difference between these time-instances (or counter values) as $\Delta t$, and then find the best match with one of the predefined values $\Delta t1$, $\Delta t2$ and $\Delta t3$, and assign the corresponding bits '0' or '1' or 'no data-bit'.

It is clear to the persons skilled in the art, that the above specifies one possible embodiment of a "physical layer" of the well-known OSI-model which can be used on the hardware of FIG. 3. The physical layer specifies how "bits" are communicated between devices. This layer typically specifies parameters like e.g. voltages, speed, and pin-out of cables.

Although any suitable higher layer protocol may be used on top of this physical layer, a suitable protocol for use in the rechargeable energy system 113 will be described next, as an embodiment, and without limiting systems according to the invention thereto.

In an example, each micro-controller 118, and thus each slave unit 115, would have a unique address on the bus, e.g. a 5-bit address in a system having 32 slave-units. The address may e.g. be hardcoded in the slave software, or written in non-volatile memory (flash or EEPROM, embedded into the slave, or externally connected thereto), or may even be set at PCB-level by stuffing pull-up or pull-down resistors, or by using dip-switches, or in any other way. A communication cycle begins with an 'idle'-state, corresponding to the "no-data-bits" mentioned above. The main control unit 120 only sends power pulses, no data. The slave units 115 are "listening" to the bus by measuring the time differences $\Delta t$ between the rising edges of successive pulses (in this case they would detect $\Delta t3$). Then, the main control unit 120 sends a data-packet consisting of a predetermined number of bits comprising instruction information and address information. As an example only, the main control unit 12 can send an 8 bits data-packet, comprising 3 bits for the instruction+5 bits for the address. Such 8-bit data packet provides for eight possible commands and thirty-two slave addresses. Of course, the length of the data-packet may be adapted to the needs, i.e. the number of addresses and the number of commands required for the particular application. One of the possible commands may be "open all first switches SW1", in which case the address field is irrelevant, and each slave unit 115 would open its first switch SW1. Another command could be: "close one first switch SW1", in which case only the addressed slave unit closes its first switch. Another command could be "measure all voltages". Each micro-controller 118 would then measure the voltage of its electrical cell 12, by using its A/D convertor, and store the value temporarily in memory. Another command could be "transmit one measured voltage", and the addressed slave would transmit the measured voltage over the second bus 40.

The communication over the second bus 140 may be based on the same frequency as the communication of the first bus 130, e.g. may be synchronous therewith, but that is not absolutely required.

In the synchronous case, each incoming power pulse would be used as a clock signal for outputting the data on the second bus 140, i.e. at each rising edge of the incoming pulses, the addressed slave would send one bit-value to its opto-coupler 135, until all bits of the measured value are sent. Since the master 120 is sending the first pulses P1 on the first bus 30, it can easily decode the data on the second bus 140.

As an example of asynchronous communication, each slave unit 115 may use its own timing, e.g. by using an RS232-like timing protocol over the optical interface, e.g. using a local clock derived from a local oscillator. Of course, the main control unit 120 would have to use the same protocol on the receiving side of the second bus 140 to decode the data received from the slaves 115.

Whereas the waveforms shown in FIG. 7A and FIG. 7B show three possible time differences $\Delta t1$, $\Delta t2$ and $\Delta t3$, the invention is not limited thereto, and other implementations are also possible, as already indicated above. For example, as a further possible implementation (not shown), only two time differences $\Delta t1$ and $\Delta t2$ may be used, whereby $\Delta t1$ corresponds to a '1' bit, and $\Delta t2$ corresponds to a '0' bit. Again, by using an appropriate protocol, e.g. by using data packets with a header field (e.g. comprising a sync-byte such as e.g. hexadecimal number 0x47 for synchronization purposes), and with a command field (e.g. 3 bits) and an address field (e.g. 5 bits), the main control unit 120 would be able to communicate to each slave unit 115 over the first bus 130 by modulating the power pulses. In this case, when no data-information is to be sent to the slaves, dummy packets could be sent on the bus, for example the "NOP" command (No OPeration), which may be implemented in any suitable manner, e.g. as one of the eight commands, but requiring no action. As described above, other protocols can be used on top of this physical layer.

As yet a further possible implementation (not shown), four time differences $\Delta t1$, $\Delta t2$, $\Delta t3$, $\Delta t4$ may be used, whereby $\Delta t1$ corresponds to the symbol '00' comprising two bits, $\Delta t2$ corresponds to '01', $\Delta t3$ corresponds to the symbol '10', and Δt4 corresponds to the symbol '11'. By using such a hardware layer, two data-bits can be sent per power pulse. Possible timing could be Δt1=about 32.5 microseconds, Δt2=about 37.5 microseconds, Δt3=about 42.5 microseconds and Δt4=about 47.5 microseconds, (each with a tolerance of +/−1.5 microseconds, or less), but another timing may also be chosen.

As still another possible implementation (not shown), five time differences Δt1, Δt2, Δt3, Δt4, Δt5 may be used, whereby Δt1 corresponds to the symbol '00' comprising two bits, Δt2 corresponding to '01', Δt3 corresponds to the symbol '10', and Δt4 corresponds to the symbol '11', and Δt5 corresponds to "no data". The latter symbol may e.g. be used as packet separator. An advantage hereof is that it is easier to resynchronize in case of sync-loss, since not an entire package or even multiple packets of a given length need to be scanned.

Form the above, it should be clear to the skilled reader, that it is also possible to send more than two data-bits per power pulse, by using more, e.g. eight or nine, predefined time differences Δt1 to Δt8 and optional Δt9, corresponding to '000', '001', . . . '111' and optional "no-data". To achieve reliable communication over the first bus 130, the rising edges is preferably be steep, i.e. have a short "rise time" in relation to the predefined distances. For example, the rise time should preferably be less than 20% of the smallest time difference between rising edges, preferably less than 10%, more preferably less than 5%, or even less than 3%. In general, the higher the pulse frequency of the first pulses P1, the shorter the rise-time has to be, in order to maintain reliable communication.

Although the first embodiment is described as an energy storage system, it is clear that the method and system for providing pulsed power and data on the bus, as explained above can also be applied in other systems where a main control unit is connected to a bus, and where one or more slave units are connected to the bus by means of a series capacitor, such as e.g. a medical implanted device mentioned above. Likewise, the slave units of such a system do not need to be balancing units, depending on the application. For example, lead acid battery cells generally do not require individual balancing, but individual monitoring may be required. The same applies for fuel cells and flow cells.

Second Embodiment

Having explained the main principles of the present invention by means of the first embodiment described in relation to FIG. 3 to FIG. 7I, further embodiments of the present invention will be easily understood. In the following all the disclosure relating to the First Embodiment above is included here by reference in this embodiment. In particular all pulse wave forms, modulation and demodulation techniques described with reference to FIG. 7a to FIG. 7h are included by reference in this embodiment.

Figure 8:
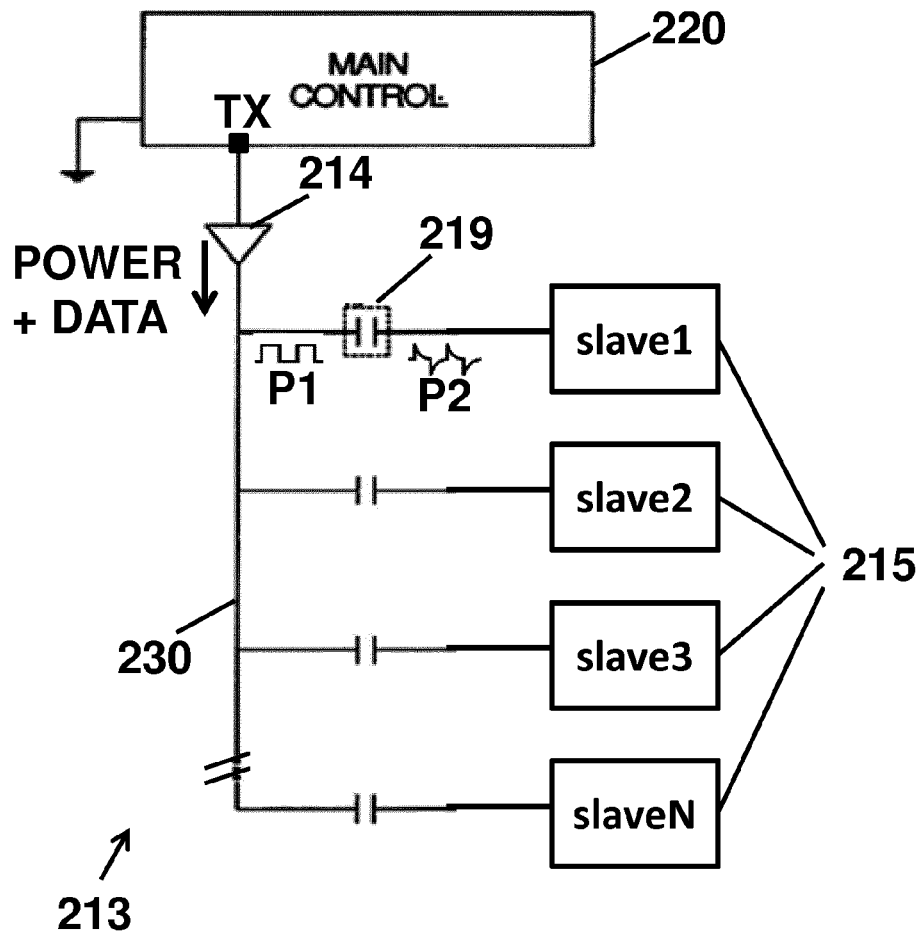
FIG. 8 shows an embodiment of a system according to aspects of the present invention, whereby the main control unit is adapted for sending power and data to a plurality of slaves, but there is no return-channel from the slaves to the main unit.

FIG. 8 shows a second embodiment of a system 213 according to aspects of the present invention, whereby the main control unit 220 is adapted for sending combined power and data pulses over a bus 230 to one or more slaves 215, which slaves 215 are connected to the bus 230 by means of series capacitors 219 (or capacitive circuits, or capacitive devices). The slaves 215 can receive the data in any of the ways or in the same way as described above (first embodiment), e.g. by measuring the time differences Δt between rising edges of the second pulses P2 seen by the microcontroller 218.

The main difference between the second embodiment and the first embodiment is that there is no second channel in the second embodiment through which the slaves 215 can communicate data to the main control unit 220. Thus the present invention can also be used in uni-directional communication systems.

Figure 9:
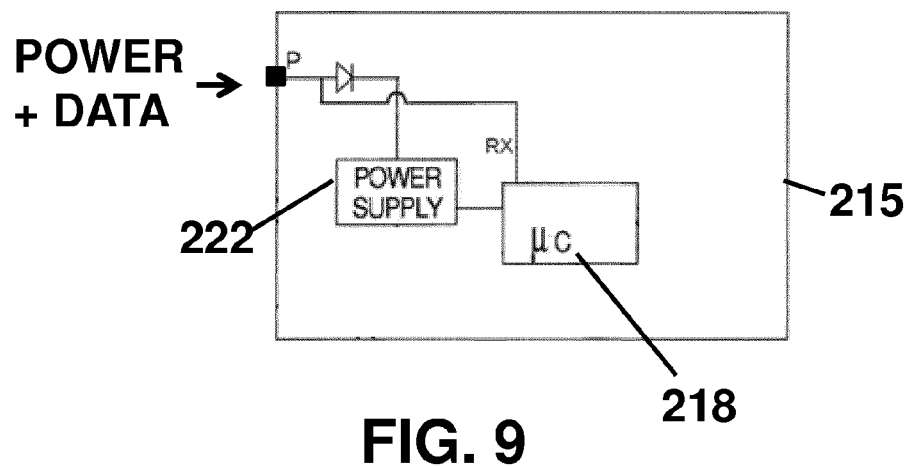
FIG. 9 shows an example of a slave unit as can be used in the system of FIG. 8.

FIG. 9 shows an example of a slave unit 215 as can be used in the system 213 of FIG. 8. It is to be noted that this slave unit 215 does not need an opto-coupler at all, and thus board space, component count and cost can be further reduced, and system reliability can be further increased.

Third Embodiment

Figure 10:
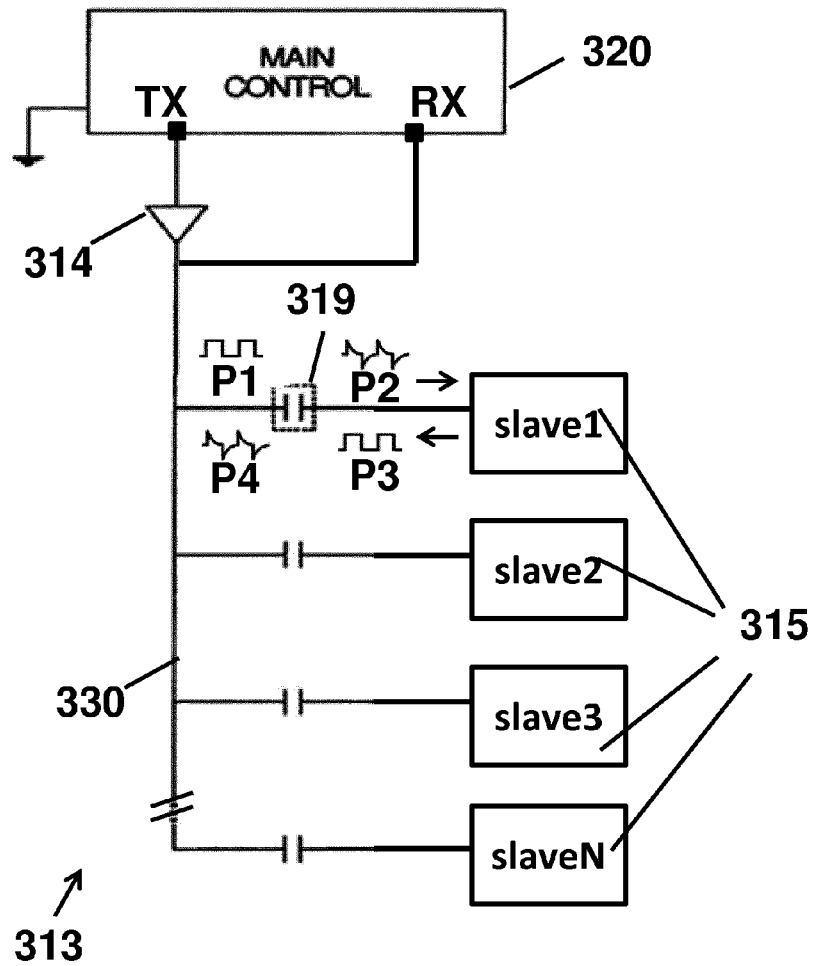
FIG. 10 shows an embodiment of a system according to aspects of the present invention, whereby the main control unit is adapted for sending power and data to a plurality of slaves over a bus, and whereby the slaves are adapted for selectively sending data to the main control unit over the same bus.

FIG. 10 shows a third embodiment of a system 313 according to aspects of the present invention, whereby the main control unit 320 is adapted for sending power and data signals over a bus 330 to one or more slave units 315, which slave units 315 are connected to the bus 330 by means of series capacitors 319 (or capacitive circuit, or capacitive device). The slave units 315 can receive the data from the main control unit 320 in any of the ways or in the same way as described above (first embodiment), by measuring the time differences Δt between rising edges of the second pulses P2. In the following all the disclosure relating to the First and Second Embodiments above is included here by reference in this embodiment. In particular all pulse wave forms, modulation and demodulation techniques described with reference to FIG. 7a to FIG. 7h are included by reference in this embodiment.

The main difference between the third embodiment and the first embodiment is that the slave units 315 can communicate back to the main control unit 320 via the same channel 330 and through the same series capacitor 319 (or capacitive circuit, or capacitive device). The main control unit 320 and the slave units 315 would, however, not be able to communicate simultaneously (not full-duplex), because baseband communication is used, but may communicate e.g. alternatingly for a predefined time period. This may require that the output driver of the AC signal generator 314 is placed in a high impedance state when the slaves are sending. However, the AC signal generator may also be decoupled from the first bus in other ways, such as e.g. by means of a switch (not shown) between the bus 330 and the AC signal generator 314, or in any other way.

In an example, first the main control unit 320 would provide sufficient energy and optionally also data to the slave units 315 by sending first pulses P1, in any manner or in a similar manner as described above, and would then stop sending pulses. Subsequently, one of the slaves would provide third pulses P3, e.g. rectangular pulses with rising edges, to the capacitor 319 (or capacitive circuit, or capacitive device) in any way or in a similar way as described above for the main control unit 320. However, the third pulses P3 need not be exactly the same as the first pulses P1 because the slave units 315 only need to send data without power to the main control unit 320, and thus the pulses P3 may e.g. have a different amplitude and/or shape and/or timing, and the data may be sent at a different frequency as is used for the first pulses. The third pulses P3 are transformed into fourth pulses P4 through the series capacitor 319 (or capacitive circuit, or capacitive device) in a similar manner as shown in FIG. 6. In contrast to the first embodiment, where the data sent by the slave units 315 could be synchronous to the first pulses (clock), that is not possible in the embodiment of FIG. 10. Instead, the micro-processor (not shown) of the main control unit 320 of the embodiment of FIG. 10 would measure the time differences Δt between the rising edges of the fourth pulses P4, and translate them into a bit-stream, which can subsequently be interpreted by the protocol being used, in a similar way as was done by the slave unit of the first embodiment. The values of the predefined time differences (e.g. Δt1, Δt2, etc) and the protocol used in the communication from the main control unit 320 towards the slave units 315 (i.e. the down-link) need not necessarily be the same as those used in the communication from the slave units 315 to the main control unit 320 (i.e. the up-link), but using the same protocol may be easier to implement.

Figure 11:
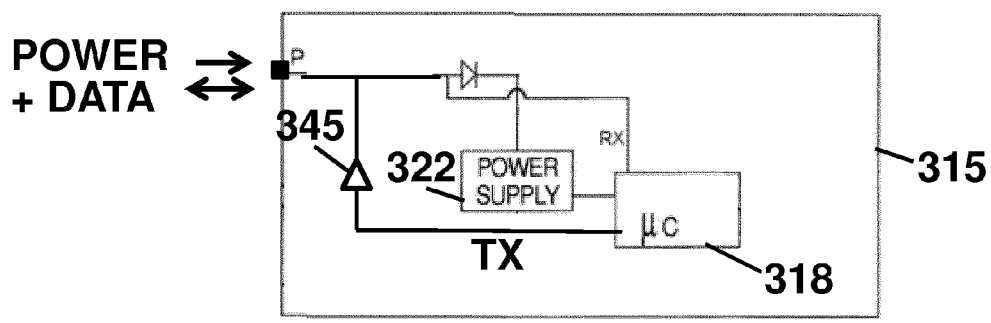
FIG. 11 shows an example of a slave unit as can be used in the system of FIG. 10.

FIG. 11 shows an example of a slave unit 315 as can be used in the system 313 of FIG. 10. It is noted that this slave unit 315 does not need an opto-coupler for communicating to the main control unit 320, but requires an additional AC signal generator 345 for generating the third pulses P3 (which are transformed into fourth pulses P4 by the capacitor 319 (or capacitive circuit, or capacitive device)). This AC signal generator 345 may comprise or consist of a voltage buffer, or may comprise an H-bridge, or other suitable circuitry. Preferably this buffer 345 is put in a high-impedance state when the main unit is sending power and/or data, or the TX-line may be disconnected from the P node in another way, e.g. by using an additional switch (not shown).

In case the system 313 is an energy storage system (thus by adding storage cells and switches SW1, SW2), that system would provide the same functionality as the prior art circuit 13 (FIG. 1), however being more compact, having a lower weight, a lower cost, and higher system reliability.

Fourth Embodiment

Figure 12:
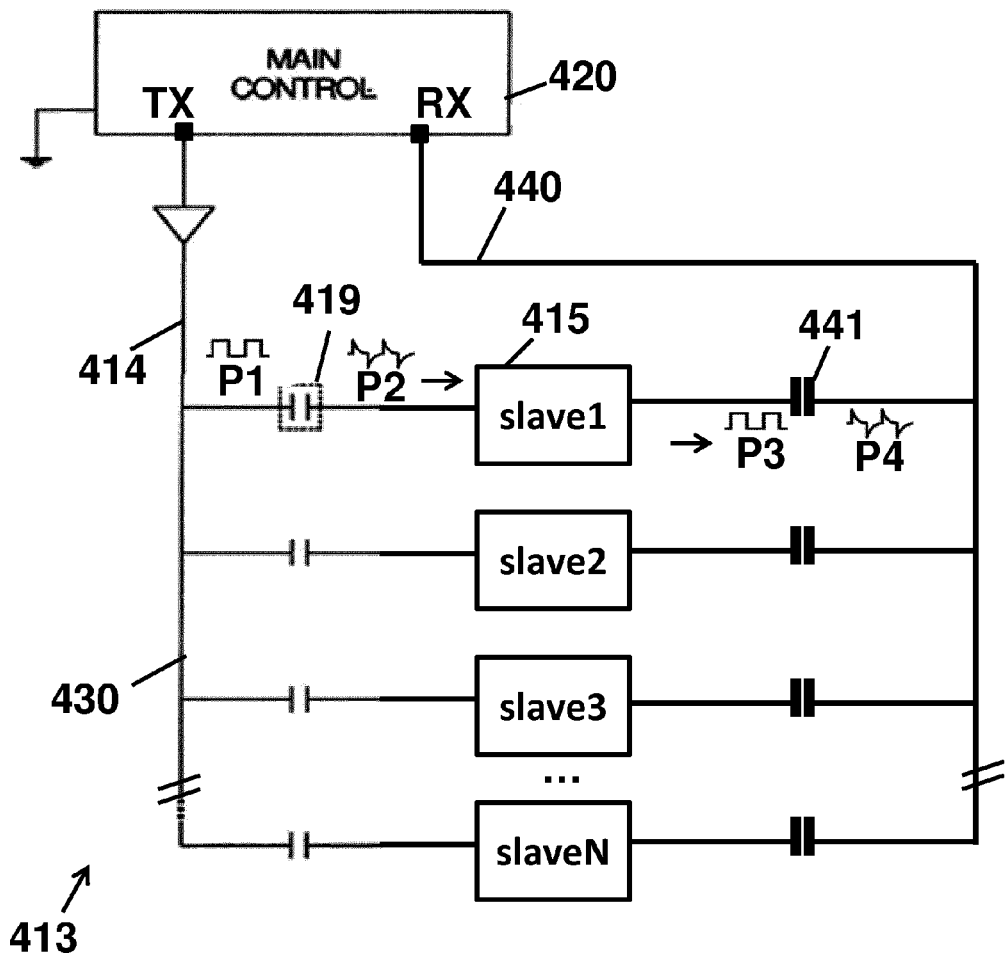
FIG. 12 shows an embodiment of a system according to aspects of the present invention, whereby the main control unit is adapted for sending power and data to a plurality of slaves via a first bus, and whereby the slaves are adapted for selectively sending data to the main control unit over a second bus, different from the first bus.

FIG. 12 shows a fourth embodiment of a system 413 according to aspects of the present invention, whereby the main control unit 420 is adapted for sending power and data signals over a bus 430 to one or more slave units 415, which slave units 415 are connected to the bus by means of series capacitors 419 (or capacitive circuit, or capacitive device). The slave units 415 can receive the data from the main control unit 420 in the same way as described above (first embodiment), by measuring the time differences Δt between rising edges of the second pulses P2. In the following all the disclosure relating to the First to Third Embodiments above is included here by reference in this embodiment. In particular all pulse wave forms, modulation and demodulation techniques described with reference to FIG. 7a to FIG. 7h are included by reference in this embodiment.

The main difference between the fourth embodiment and the first embodiment (of FIG. 3) is that the slave units 415 can communicate back to the main control unit 420 via a second channel 440 different from the first channel 430, but instead of using opto-couplers, galvanic separation is obtained by means of second series capacitors 441 (or capacitive circuit, or capacitive device).

In an example, first the main control unit 420 would provide sufficient energy and optionally also data to the slave units 415 by sending first pulses P1, in any manner or in a similar manner as described above. Depending on the implementation, in particular on the processing capabilities of the microcontroller, the main unit may then stop sending pulses so that the slave units do not require decoding or demodulating, or may continue sending power pulses only, or may continue sending power and data pulses, but only for a subset of the slaves. Subsequently, one of the slaves would provide third pulses P3, e.g. rectangular pulses with rising edges, to the capacitor 441 (or capacitive circuit, or capacitive device) in any way or in a similar way as described above for the main control unit 420. However, as described above, the third pulses P3 need not be exactly the same as the first pulses P1 because the slave units 415 only need to send data without power to the main control unit 420, and thus the pulses P3 may e.g. have a different amplitude and/or shape and/or timing. The third pulses P3 would be transformed into fourth pulses P4 through the series capacitor 441 (or capacitive circuit, or capacitive device) in any manner or in a similar manner as shown in FIG. 6. The third pulses P3 may be, e.g. may be sent at substantially the same clock frequency as the first pulses P1, or at another clock frequency, e.g. at a local clock frequency of the microcontroller. The values of the predefined time differences (e.g. Δt1, Δt2, etc) and the protocol used in the communication from the main control unit 420 towards the slave units 415 (i.e. the down-link) need not necessarily be the same as those used in the communication from the slave units 415 to the main control unit 420 (i.e. the up-link), but using the same protocol may be easier to implement.

Figure 13:
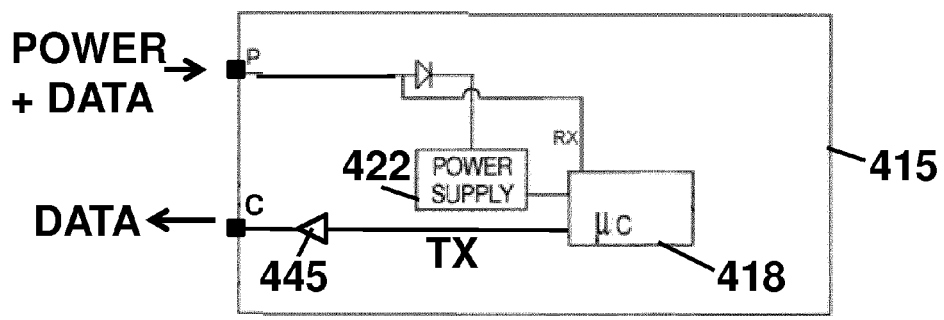
FIG. 13 shows an example of a slave unit as can be used in the system of FIG. 12.

FIG. 13 shows an example of a slave unit 415 as can be used in the system 413 of FIG. 12. It is noted that this slave unit 415 does not need an opto-coupler for communicating to the main control unit 420, but requires an additional AC signal generator 445 for generating the third pulses P3. This AC signal generator may comprise or consist of a voltage buffer, or may comprise an H-bridge, or other suitable circuitry. The AC signal generator 445 would not be connected to the node "P" but to a separate node "C", for connection to the series capacitor 441 (or capacitive circuit, or capacitive device).

In case the system 413 is an energy storage system (thus by adding storage cells and switches SW1, SW2), that system would provide the same functionality as the prior art circuit 13 (FIG. 1), however being more compact, having a lower weight, a lower cost, and higher system reliability, since the CAN-bus has been removed, and all opto-couplers are replaced by capacitors 419, 441 (or capacitive circuits, or capacitive devices).

The invention claimed is:

1. A system for providing power and data signals from a main control unit to at least one slave unit via a first bus comprising:
    the main control unit comprising a first AC signal generator adapted for providing a first AC signal comprising a plurality of first pulses for providing power to the at least one slave unit via the first bus;
    each slave unit being AC-coupled to the first bus by means of a first series capacitor device, each first series capacitor device being arranged for converting the first pulses provided at its inputs into second pulses at its output, the second pulses having at least one edge or flank;
    the main control unit being adapted for sending data to the at least one slave unit by modulating the plurality of first pulses;
    the at least one slave unit being adapted for receiving the data by demodulating the plurality of second pulses by determining pulse amplitudes or time differences between receipt of the at least one edges or flanks or by counting pulses.

2. The system of claim 1 wherein the at least one edges or flanks are rising or falling edges, and the slave unit is adapted to determine time differences between receipt of the rising or falling edges of different pulses.

3. The system of claim 1, wherein the at least one edges or flanks are rising edges and falling edges and the slave unit is adapted to determine time differences between receipt by the slave unit of rising edges and trailing edges of a pulse.

4. The system according to claim 1, wherein:
the main control unit is adapted for providing the first AC signal such that the first pulses have a rising or falling edge;
the main control unit is adapted for sending the data by changing the time distances between the rising or falling edges of consecutive first pulses;
at least one slave unit is adapted for receiving the data by determining the time distances between the rising or falling edges of consecutive second pulses, and for translating the determined time distances to corresponding data-symbols.

5. The system according to claim 1, wherein the main control unit and the at least one slave unit are adapted for applying resp. detecting at least a first and a second predetermined time distance ($\Delta t1$, $\Delta t2$) corresponding to a first and a second data symbol.

6. The system according to claim 1, wherein the system is a rechargeable energy storage system comprising a string of rechargeable energy storage devices coupled in series, and each slave unit is a balancing unit for charging or discharging one of the rechargeable energy storage devices.

7. The system according to claim 1, furthermore comprising a second bus, connected between the main control unit and the at least one slave unit by means of a galvanic decoupling element for communicating data from the at least one slave unit to the main control unit.

8. The system according to claim 7, wherein the at least one slave unit is adapted for sending data to the main control unit over the second bus synchronously with the first AC signal.

9. The system according to claim 7, wherein:
the galvanic decoupling element is a second series capacitor device;
the at least one slave unit is adapted for providing a second AC signal comprising a plurality of third pulses having a rising or a falling edge to the second series capacitor device, whereby the time distances between the rising or falling edges of consecutive third pulses are modulated according to the data to be sent from the slave unit to the main control unit;
the main control unit is adapted for detecting the time distances between the rising or falling edges of fourth pulses originating at an output of the second series capacitor devices when the third pulses are applied to its input.

10. A method for providing power and data signals from a main control unit to at least one slave unit via a first bus, the at least one slave unit being AC-coupled to the first bus by means of one or more series capacitor devices, the method comprising the steps of:
providing combined power and data signals from the main control unit to the at least one slave unit by generating a first AC signal comprising a plurality of first pulses, each pulse having at least one edge or flank, and by applying the first AC signal to the first bus;
receiving the first pulses at the input of the one or more series capacitor devices, and providing second pulses at the output of the one or more series capacitor devices;
sending the data from the main control unit to the at least one slave unit by modulating the plurality of first pulses;
receiving the data in the at least one slave unit by demodulating the plurality of second pulses by determining pulse amplitudes, or time differences between receipt of the at least one edges or flanks or by counting pulses,
wherein the at least one edges or flanks are rising or falling edges and the slave unit is adapted to determine time differences between receipt of the rising or falling edges of different pulses.

11. The method of claim 10, the modulating and demodulating being by any of, or any combination of pulse position modulation (PPM), pulse width modulation (PWM), PFM (pulse frequency modulation), pulse interval modulation (PIM), or pulse count modulation.

12. The method according to claim 10, wherein:
the first AC signal is generated such that the first pulses have a rising or a falling edge;
the modulation of the first pulses is done by changing the time distances between the rising or falling edges of consecutive first pulses;
the demodulation of the second pulses is done by detecting the time distances between the rising or falling edges of consecutive second pulses, and by translating the determined time distances to corresponding data-symbols.

13. The method according to claim 10, wherein
the first AC generator applies a first and a second predetermined time-distance ($\Delta t1$, $\Delta t2$) for transmitting a first and a second data symbol;
and wherein the at least one slave unit demodulates the second pulses by measuring the time distances between the rising or falling edges of consecutive second pulses, and by selecting one of the first and second predefined time distances ($\Delta t1$, $\Delta t2$) corresponding to the measured time distance, and by translating the selected time distances ($\Delta t1$, $\Delta t2$) to corresponding the first and second data symbols.

14. The method according to claim 10, the at least one slave unit furthermore being communicatively coupled to a second bus by means of a galvanic decoupling element, the method furthermore comprising the step of:
communicating data from one of the slave units via the second bus to the main control unit.

15. A method for providing power and data signals from a main control unit to at least one slave unit via a first bus, the at least one slave unit being AC-coupled to the first bus by means of one or more series capacitor devices, the method comprising the steps of:
providing combined power and data signals from the main control unit to the at least one slave unit by generating a first AC signal comprising a plurality of first pulses, each pulse having at least one edge or flank, and by applying the first AC signal to the first bus;
receiving the first pulses at the input of the one or more series capacitor devices, and providing second pulses at the output of the one or more series capacitor devices;
sending the data from the main control unit to the at least one slave unit by modulating the plurality of first pulses;
receiving the data in the at least one slave unit by demodulating the plurality of second pulses by determining pulse amplitudes, or time differences between receipt of the at least one edges or flanks or by counting pulses,
wherein the at least one edges or flanks are rising edges and falling edges and the slave unit is adapted to determine time differences between receipt by the slave unit of rising edges and falling edges of a pulse.

16. The method of claim 15, the modulating and demodulating being by any of, or any combination of pulse position modulation (PPM), pulse width modulation (PWM), PFM (pulse frequency modulation), pulse interval modulation (PIM), or pulse count modulation.

17. The method according to claim 15, wherein:
the first AC signal is generated such that the first pulses have a rising or a falling edge;
the modulation of the first pulses is done by changing the time distances between the rising or falling edges of consecutive first pulses;
the demodulation of the second pulses is done by detecting the time distances between the rising or falling edges of consecutive second pulses, and by translating the determined time distances to corresponding data-symbols.

18. The method according to claim 15, wherein
the first AC generator applies a first and a second predetermined time-distance ($\Delta t1$, $\Delta t2$) for transmitting a first and a second data symbol;
and wherein the at least one slave unit demodulates the second pulses by measuring the time distances between the rising or falling edges of consecutive second pulses, and by selecting one of the first and second predefined time distances ($\Delta t1$, $\Delta t2$) corresponding to the measured time distance, and by translating the selected time distances ($\Delta t1$, $\Delta t2$) to corresponding the first and second data symbols.

19. The method according to claim 15, the at least one slave unit furthermore being communicatively coupled to a second bus by means of a galvanic decoupling element, the method furthermore comprising the step of:
communicating data from one of the slave units via the second bus to the main control unit.

* * * * *